United States Patent [19]

Strader

[11] Patent Number: 4,854,446
[45] Date of Patent: Aug. 8, 1989

[54] ELECTRICAL CONDUCTOR

[75] Inventor: Don S. Strader, Fairfield Glade, Tenn.

[73] Assignee: The Goodyear Tire & Rubber Company, Akron, Ohio

[21] Appl. No.: 227,922

[22] Filed: Aug. 3, 1988

[51] Int. Cl.$^4$ .............................................. B65G 43/00
[52] U.S. Cl. ...................................... 198/810; 340/676
[58] Field of Search ................. 198/810, 856; 340/676

[56] References Cited

U.S. PATENT DOCUMENTS

| | | | |
|---|---|---|---|
| 3,602,360 | 8/1971 | Halbach et al. | 198/40 |
| 3,636,436 | 11/1972 | Kurauchi et al. | 198/810 |
| 3,656,137 | 4/1972 | Ratz | 340/676 |
| 3,731,113 | 5/1973 | Lowe et al. | 307/119 |
| 3,731,786 | 5/1973 | Nagata et al. | 198/810 |
| 3,742,477 | 6/1973 | Enabnit | 340/259 |
| 3,831,161 | 8/1974 | Enabnit | 340/259 |
| 3,834,518 | 9/1974 | Specht et al. | 198/810 |
| 3,899,071 | 8/1975 | Duffy | 198/232 |
| 4,017,826 | 4/1977 | Enabnit | 340/58 |
| 4,296,855 | 10/1981 | Blalock | 198/810 |
| 4,437,563 | 3/1984 | Oriol | 198/810 |
| 4,621,727 | 11/1986 | Strader | 198/810 |
| 4,653,633 | 3/1987 | Jacobs | 198/810 |

FOREIGN PATENT DOCUMENTS

| | | | |
|---|---|---|---|
| 2030796 | 4/1972 | Fed. Rep. of Germany . | |
| 3228206A-1 | 7/1982 | Fed. Rep. of Germany . | |
| 220012 | 12/1983 | Japan | 198/810 |
| 81315 | 4/1986 | Japan | 198/810 |
| 1384499 | 2/1975 | United Kingdom . | |

OTHER PUBLICATIONS

Montan-Forschung Technical Bulletin.
Sensor Guard Bulletin.

Primary Examiner—Joseph E. Valenza
Attorney, Agent, or Firm—R. J. Slattery, III

[57] ABSTRACT

A conveyor belt (10) having an electrically conductive sensor (20) or antenna embedded therein. The conductor (20) has a copper core having a plurality of stainless steel filaments wrapped together to form a strand or a cable. The conductor has a low profile corss section making it suitable for use in thin belts. The conductor is formed in a repeating sine wave to aid in flexibility. The conductor/belt is especially useful in conveyor rip detection systems.

26 Claims, 2 Drawing Sheets

ELECTRICAL CONDUCTOR

BACKGROUND

The invention pertains to conveyor belts which require electrical conductors, sensors, antennas, etc., embedded therein and systems which utilize such belts. More specifically this invention relates to an improved conductor, antennas, sensors, etc., which can be utilized in such belts.

Commonly an electrical conductor, such as a wire is formed into a closed current path, such as a loop and installed within an elastomeric conveyor belt. Brass plated high strength steel wire and copper cables (such as shown by British Patent No. 1,384,499) have been used. The belt may have one or more conductors extending the length of the belt, along the direction of travel, or it may have one or more conductors extending across the width of the belt spaced apart from one another along the length of the belt. These conductors remain substantially de-energized, i.e. no current flow, until they pass a detector, such as a coil which induces a current flow within the conductor. A detection means is then used to monitor or detect the induced current flow in the conductor. This information may be used to control the movement of the belt, such as positioning indication, or to indicate the occurrence of a rip or tear in the belt.

It is commonly known that heavy duty conveyor belts are susceptible to longitudinal slitting or tearing. If the belt is not stopped within a short period of time after the rip starts, the tear can continue along extremely long lengths of the belt causing extensive destruction or repairs of the belt and/or conveyor system. By stopping the belt quickly, the damage can be minimized, thereby reducing the cost and the down time to make repairs. Therefore, it is important to keep the integrity of the detection system high. However, over a period of time, one or more of the conductors may fail.

A conductor may fail for various reasons. A conductor within a belt is repeatedly flexed by the operation of the belt. This includes changes in direction, rollers, and by the load which is received, transported and discharged. This repeated flexing, bending, elongation, constriction etc., may result in the eventual failure due to fatigue of the conductor.

Another cause for failure is environmental. A conveyor belt may be subjected to a variety of environmental conditions. Water for example either as a liquid or a vapor, may come in contact with the conductor. The pulley covers in which these conductors are embedded may be subject to porosity and/or to the development of fine cracking or crazing during operation allowing for the entrance of moisture. The entrance of water can then corrode the conductor, causing it to weaken and eventually break. To compound this problem many belts are used in areas or environments having acidic (low PH) conditions. Therefore, the moisture which permeates through the belt to the conductor may also be acidic in nature. This increases the likelihood that the conductor will become corroded and eventually fail.

If a belt develops a rip, the rip will propagate until one of the conductors is broken. The detection system will then detect the broken conductor and stop the belt. However, if a conductor fails as described above, the detection system will stop the conveyor, not knowing that there really is not a rip. In order to continue operation, the conductor must be replaced, if possible, or the detection system adjusted to not monitor the area of the belt where the broken conductor exists or the entire detection system turned off. The latter two options result in reduced or no belt protection where rips could occur and cause much damage before detection.

DESCRIPTION OF THE DRAWINGS

The following is a brief description of the drawings.

DESCRIPTION OF THE INVENTION

Figure 1:
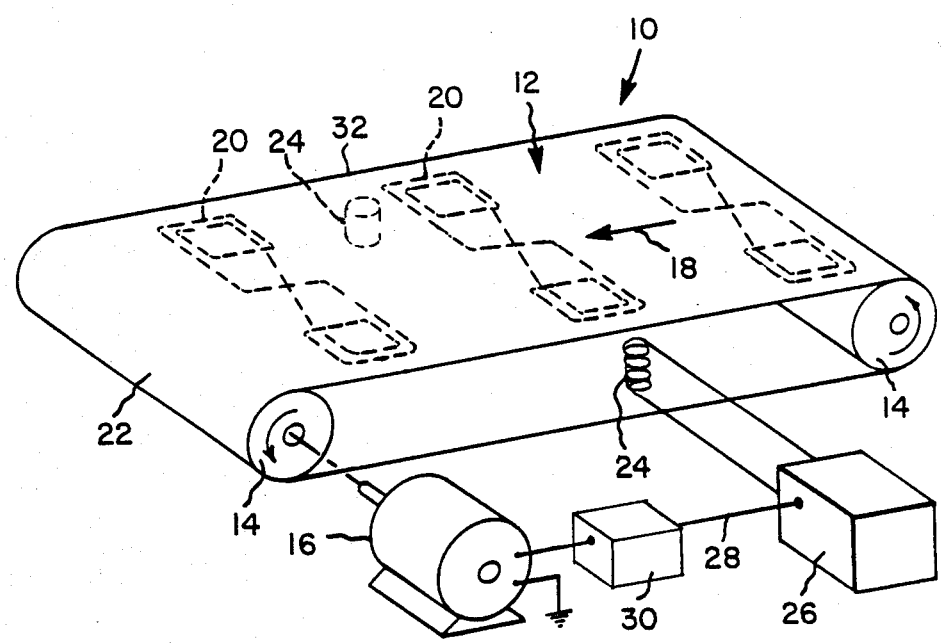
FIG. 1 is a simplified perspective view of a conveyor belt rip detection system.

According to one aspect his invention provides for a conveyor belt which has a corrosion-resistant metallic conductor, sensor, antenna, etc. embedded therein to form a closed current loop.

According to one aspect of the invention the conductor comprises a conductive core of a first metal and an outer wrap of strength filament and/or strands of a second metal. The conductive core is a metal which has good conductive characteristics such as those of the metals of copper, brass, aluminum, etc. The conductor will be subjected to repeated bending and flexing during operation and therefore it should have good fatigue resistance, the ability to resist weakening or failure from these repeated cycles. However, the characteristics of high fatigue resistance and high conductivity (low electrical resistance) are generally mutually exclusive. Therefore, the conductor further comprises a plurality of strength filaments and/or strands having a higher fatigue resistance than the conductive core. These strength filaments and/or strands are wrapped about the conductive core for increasing the fatigue resistance of the conductive core to the bending and flexing etc. which occurs during the operation of the conveyor belt. It is further preferred that these outer strength filaments be resistant to corrosion in order to prolong the life of the conductor in corrosive environments as explained above.

According to another aspect of this invention the strength filaments should be selected to be electrically conductive. Because the conductive core will generally have poor fatigue characteristics it will eventually start to develop surface cracks. These cracks may propagate until the conductive core is completely broken. If, however, the outer strength conductors are somewhat conductive they will be able to bridge the cracks, allowing the continued conduction of electricity. This will increase the overall resistance (electrical) of the conductor because the strength filaments will generally have a higher electrical resistance than the conductive core, but will allow the conductor to continue to operate until the number and degree of cracks increases the resistance to a threshold level where it is essentially inoperable for its intended use. As the resistance of the conductor increases as the number of cracks increases the monitoring equipment will be able to determine which conductor needs to be replaced before they completely fail. This may allow the monitoring equipment to determine if the conductor failed due to internal failure, such as fatigue or if it failed due to an external failure, such as a rip. The latter would require a system shut down while the former would require the system to bypass that conductor or antenna and keep the system operating.

One conductor that could be made according to this invention would comprise a plurality of stainless steel filaments wrapped about a stainless steel core. However, this would result in a conductor which has a large overall diameter.

One conductor that has been made according to this invention comprises a plurality of stainless steel filaments, as the strength conductors, wrapped around or about a copper core to form a strand or cable. Stainless steel has good fatigue resistance and is resistant to corrosion while being somewhat electrically conductive. The copper core may be a single solid filament or a number of individual copper filaments wrapped together to form a copper strand. As used herein, a "filament" refers to an individual metallic wire; and a "strand" refers to a group of filaments twisted, plaited or laid parallel to form a unit. A cable refers to a structure comprising two or more strands, or a combination of at least one strand with at least one filament.

The electrical conductor is embedded within a conveyor belt comprising an elastomeric body having a load carrying surface or cover and a parallel pulley engaging surface or cover with a reinforcement ply disposed within the elastomeric body. The electrical conductor could be embedded into either the load carrying or pulley engaging surfaces, located between reinforcing plies, or between a reinforcing ply and either surface or cover.

The electrical conductor may extend along the direction of travel of the belt or one or more conductors may extend across the width of the belt, spaced apart from one another along the direction of travel. The electrical conductors are located within the belt in a predetermined pattern. This may include such patterns as a loop, rectangle, oval, polygon, substantially a figure eight, etc.

In order to help facilitate bending, flexure, and elongation the conductor may be formed to impart a substantially repeating sinusoidal wave form therein. Although, the sinusoidal wave form could be three dimensional, i.e. as a spiral winding, it is preferred that the sinusoidal wave form be two dimensional, i.e. flat or only in one plane. Instead of a repeating sine wave the conductors could be formed in other repeating undulations such as a square wave, saw tooth, etc. The conductor so formed is then placed into the predetermined pattern as described above (rectangle, oval, Figure 8, etc.). The belt with the conductor therein may then be incorporated into or with a positioning and/or rip detection system.

This invention results in belts and/or systems having conductors therein which can bend or flex along with the belt during operation. Furthermore, the invention provides for conductors which are resistant to the corrosive environments of certain operations, such as mining. This then provides for a belt or system which has an improved service life and improved electrical and/or magnetic integrity in the conductor, requiring less down time for repairs thereof and improved reliability.

The improved electrical conductors can be used not only in new belt construction but are also suitable as a replacement for existing conductors which have been damaged and/or have become inoperable in the field.

Furthermore, the conductor disclosed herein has a relatively small thickness or cross-section making it suitable for use in belts having relatively thin cross-sections. The smaller thickness allows for the installation in pulley engaging surfaces having, for example, $\frac{1}{4}''$ or less of cover.

The invention may be used in any type of reinforced elastomeric belts. This includes fabric-reinforced belts as well as cable-reinforced belts. However, rip detecting systems have been typically used on cable-reinforced belting due to the high replacement cost and their use in crucial applications. Furthermore, the cable-reinforced belting is susceptible to long longitudinal tearing once a tear or rip is started.

Now referring to FIG. 1, there is illustrated a belt rip detection system as shown generally by reference numeral 10. An elastomeric conveyor belt 12, known as an endless conveyor belt, has a plurality of rollers 14 (of which only two are shown) for supporting the belt 12 for movement. A motor 16 provides the power to drive a roller 14 which in turn drives the conveyor belt 12 in a direction of travel indicated by arrow 18. It being understood that the motor could also drive the belt in the opposite direction.

In the conveyor belt 12 a plurality of conductors, sensors, antennas, etc. 20 are embedded in the elastomeric belt 22 transverse to the direction of travel 18. The conductors 20 are shown in a simplified schematic form and are arranged in a pattern which is substantially a figure eight. The conductors may be used in connection with a rip detection system which utilizes magnetic or electrical fields, depending on the type of detection system used. The conductors in such a system are commonly used to generate a current flow therein, when subjected to an electrical or magnetic field. A rip in the belt will eventually propagate until one of the conductors 20 is broken. The breaking of the conductor results in a stoppage of the current flow, which in turn terminates the electrical field generated by the current flow. A pair of coils or detectors 24 such as a transmitter/receiver are coupled to the conductors 20 and can sense the loss of the electrical field, i.e. a rip. The detector 24 provides a signal to control circuiting 26 which can process this signal and provide a signal which indicates a rip. The RIP signal may result in an alarm, audio and/or visual, whereby an operator can manually shut down the belt conveyor, and/or in a signal 28 to the motor controller 30 to automatically stop the motor 16 and shut down the conveyor belt 12. Various detection systems have been used to monitor the breaking of the loop conductor 20. For example, U.S. Pat. No. 3,742,477 for a Belt Damage Detector, U.S. Pat. No. 3,831,161 for Fail-Safe Monitoring Apparatus and U.S. Pat. No. 4,017,826 for a Method and Apparatus for Extending the operating range of a condition monitoring system are just three examples and are hereby incorporated by reference. It is understood that the conductor disclosed herein can be used with other various detection systems. For example, the detector 24 may sense the resistance, magnetic flux, capacitance or electrostatic field, or electromagnetic fields across the belt.

The control circuitry 26 can monitor the signal received from the detectors 24 to determine which conductors or antenna 20 are beginning to fail due to wear.

If the signal from each antenna is stored in a memory when the belt is new or a new antenna is installed the control circuitry can compare the signal received at that location with the original stored signal. Over a period of time the received signal will become diminished because more and more of the signal will be carried by the stainless steel filament indicting that the conductor has started to fail at that location. The control circuitry 26 can at a predetermined point, provide a signal indicating the potential failure of a particular conductor 20. By determining the potential failure of a conductor the control circuitry can automatically bypass that conductor, if desired, to prevent a nuisance shutdown by an internal failure and not a rip.

The conductor 20 may extend completely across the belt so that it is in contact with the belt edge or it may be spaced away from the edge depending upon the type of detection system and specific requirements.

Figure 2:
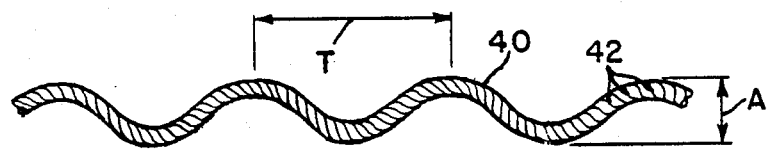
FIG. 2 is an enlarged fragmentary view of an electrical conductor according to one aspect of the invention.

Referring to FIG. 2 there is illustrated an enlarged fragmentary view of one embodiment of the electrical conductor. The conductor 40 comprises a number of stainless steel filaments 42 wrapped about a copper core. The conductor 40 has been further formed into a repeating flat sinusoidal wave form. Although the period "T" of the sine wave may vary depending upon the application, conductors have been manufactured having a period or pitch of between about ¾" (19 mm) to about ⅞" (22 mm) with a peak to peak amplitude "A" from about 5/16" (7.9 mm) to about 6/16" (9.5 mm). The sinusoidal conductor is then formed into various patterns.

Figure 3:
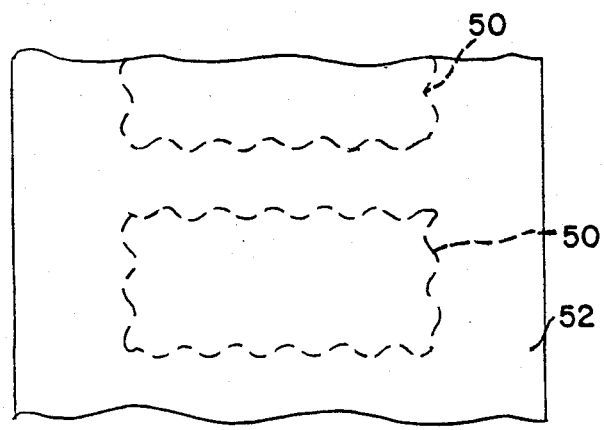
FIG. 3 is a partial view of a belt 52 having an electrical conductor of FIG. 2 embedded therein in one type of pattern.

The conductor may be formed into substantially a figure eight as shown in FIG. 1 or into another predetermined pattern. FIG. 3 illustrates an alternate embodiment where a sinusoidal conductor 50 has been formed into a rectangle and embedded into the belt 52.

Figure 4:
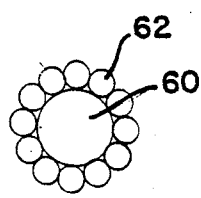
FIG. 4 is a cross-sectional view of a conductor according to one embodiment of this invention.
Figure 5:
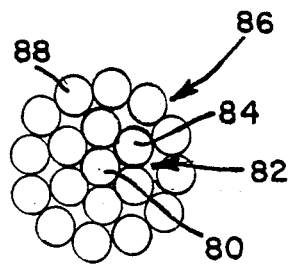
FIG. 5 is a cross-sectional view of another conductor according to another embodiment of this invention.

FIGS. 4 and 5 are cross-sectional views of two different conductors which have been produced according to one aspect of the invention. The conductors each have a solid copper core having a plurality of stainless steel filaments wrapped or twisted about the copper core. Each conductor has several filaments which are in line contact with the copper core. This allows the stainless steel filaments to carry some of the electrical signal. This is especially important as the copper conductor begins to eventually wear and develops cracks as noted above. The stainless steel provides a current path for bridging these cracks and maintaining the electrical integrity of the conductor. The conductors of FIGS. 4 and 5 are just two of the type of conductors which can be produced according to this invention. It should be noted that the diameter of each filament and the number of filaments may vary depending upon the belt, field conditions and type of detection system used.

In FIG. 4 copper core 60 is wrapped by a number of parallel stainless steel filaments 62 positioned beside and against each with each filament in line contact with the copper core. Each filament 62 is twisted in the same direction. The copper core may have a diameter in the range of about 0.01 mm to about 0.15 mm and preferably in the range of 0.02 mm to 0.03 mm. The individual stainless steel filaments may have a diameter in the range of 0.02 mm to about 0.08 mm with the preferred range being from about 0.02 mm to about 0.025 mm.

In FIG. 5, the conductors have two layers of stainless steel filaments wrapped about a copper core 80. The first or inner layer 82 of stainless steel filaments may be sloped or twisted in one direction while the second or outer layer 86 of stainless steel filaments 88 may be sloped or twisted in the opposite direction to the inner layer 82.

As used herein, the direction of twist, lay or a helix refers to the direction of slope of the spirals of a strand or filament when held vertically. "Pitch length" is the axial distance required for a helically disposed filament to make one 360° revolution.

The copper core herein may have a diameter of from about 0.07 mm to about 0.15 mm with the preferred range being from about 0.035 mm to about 0.050 mm. The steel filaments 84 and 88 may have a diameter from about 0.02 mm to about 0.08 mm with a preferred range of from 0.02 mm to about 0.025 mm.

The helixes have been formed by the plurality of stainless steel filaments having a pitch length in the range of about 4 mm to 8 mm with the preferred being 5 mm to 7 mm.

The electrical resistance of each conductor should be less than 0.9 ohms per foot (30.5 cm) with the preferred range being from about 0.25 ohms or less to less than 0.75 ohms per foot (30.5 cm).

Figure 6:
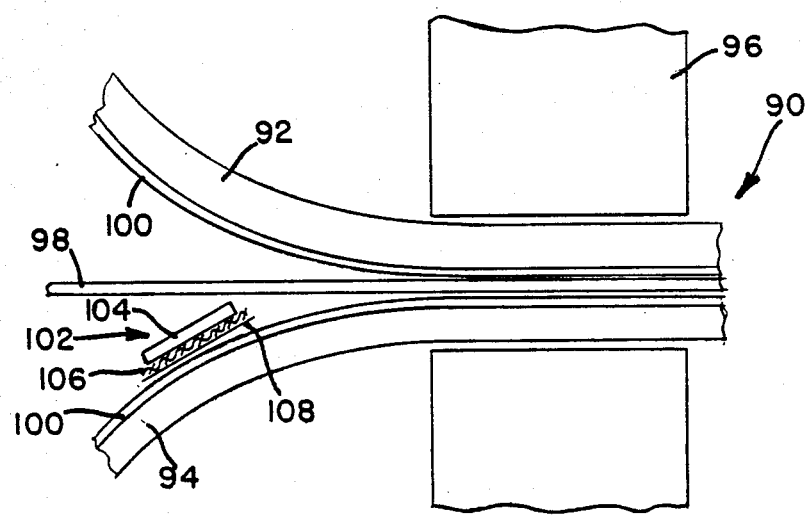
FIG. 6 is a sectional view of one method of installing the conductor during fabrication of the belt.

The conductor can be installed in the belt in a number of manners. Referring for example, to FIG. 6, there is illustrated the construction of an unvulcanized belt shown generally as 90. The belt has an elastomeric body having an load carrying surface 92 and a pulley engaging surface 94 which are fed into a compactor 96. In between the two layers 92 and 94 are the reinforcing cables 98. Each layer 92 and 94 has a layer of insulation gum 100 applied to a surface for engaging with each other and the cables. The conductor assembly 102 comprises an insulation layer 104 which may also be a gum, to electrically isolate the conductor from and attach to the cables. A fabric layer 106 may be placed between the insulation layer 104 and the conductor 108. The belt assembly is compacted by the compactor 96 and then fed to a press and finally vulcanized.

The electrical conductor can also be installed in the field as is currently common practice in the art. This normally entails cutting out the old conductor and replacing it with a new one. The cut rubber is then replaced with unvulcanized rubber and then the repaired area is cured by a portable curing unit.

Another method for installing the device is as set forth in U.S. Pat. No. 4,621,727 for a Conveyor Belt Damage Sensor and is incorporated herein as a reference.

While certain representative embodiments and details have been shown for the purpose of illustrating the invention, it will be apparent to those skilled in this art that various changes and modifications may be made therein without departing from the scope of the invention.

It is claimed:

1. An endless conveyor belt having a direction of travel comprising:
   (a) an elastomeric body having a load carrying surface and a parallel pulley engaging surface;
   (b) a reinforcement ply disposed within said elastomer body; and
   (c) a conductor, disposed within said belt in a predetermined pattern forming a closed current path; and wherein said conductor comprises a plurality of strength filaments or strands of a first metal wrapped about a conductive core of a second metal, said strength filaments or strands having a higher fatigue resistance than the conductive core, for increasing the fatigue resistance of the conductive core.

2. The belt of claim 1 wherein said strength filaments or strands are electrically conductive.

3. The belt of claim 2 wherein said strength filaments or strands are resistant to corrosion.

4. The belt of claim 3 wherein the conductor has a substantially repeating undulation wave form in only one plane along said predetermined pattern.

5. The belt of claim 3 further comprised by a plurality of said conductors, each disposed within said belt in a predetermined pattern and forming a closed current path, and each said conductor being spaced apart from one another along the direction of travel of the belt.

6. The belt of claim 5 wherein said conductors are disposed within said belt transverse to the direction of travel of said belt.

7. The belt of claim 6 wherein said conductive core is copper and said strength filaments or strands are stainless steel.

8. The belt of claim 7 wherein each conductor is a repeating sine wave formed in only one plane, along said predetermined pattern.

9. The belt of claim 7 wherein the copper core of each conductor is helically wrapped by a plurality of inner stainless steel filaments which are in turn wrapped by a plurality of outer stainless steel filaments.

10. The belt of claim 7 wherein the copper core is helically wrapped by a strand of stainless steel filaments.

11. The belt of claim 3 wherein said reinforcement ply comprises at least one layer of a plurality of steel cables.

12. The belt of claim 3 wherein said reinforcement ply comprises at least one fabric layer.

13. The belt of claim 1 wherein said conductor is disposed within said pulley engaging surface.

14. The belt of claim 1 wherein said conductor is disposed between said reinforcing ply and said lower pulley engaging surface.

15. The belt of claim 1 wherein said reinforcement ply comprises at least two layers of reinforcement and wherein said conductors are disposed between said reinforcing plies.

16. In a conveyor belt detection system being an endless conveyor belt having an elastomeric body having a load and a parallel pulley surface, a reinforcement ply disposed within said body, and a plurality of conductors disposed within said body, each said conductor forming a closed current path; a means to drive said belt in a direction of travel; a detector means disposed a predetermined distance from said belt for determining the continuity of said conductors; and a control means responsive to an output signal from said detector means for providing a signal indicating a loss of continuity of at least one conductor, wherein said conductor comprises:

a plurality of stainless steel filaments wrapped about a copper core and each said conductor having a substantially flat repeating sinusoidal wave form; and each said conductor being disposed within said belt in a predetermined pattern extending transverse to the direction of travel.

17. The conductor of claim 16 wherein the diameter of the conductor is less than 1.0 mm.

18. The system of claim 16 wherein the electrical resistance is less than or equal to 2.0 ohms per foot.

19. The system of claim 16 wherein the copper core is a single filament.

20. The system of claim 16 wherein the copper core is a plurality of twisted copper filaments.

21. The system of claim 16 wherein the plurality of stainless steel filaments includes a plurality of inner and outer filaments and wherein the inner stainless steel filaments are laid on the circumference of the copper core and the outer stainless steel filaments are laid about the outer periphery of the inner stainless steel filaments.

22. The system of claim 16 wherein said control means provides an indication responsive to said output signal from said detector of the wear of said conductor.

23. The system of claim 22 wherein said control means comprises a means for storing a signal from said conductor; a means for comparing the stored signal with a received signal; and a means for automatically by passing said conductor when said received signal reaches a predetermined level.

24. A system for detecting a rip in a conveyor belt moveable in a closed path of travel comprising detector means positioned along the path of travel, and an elastomeric containing conveyor belt having electrically conductive conductors or antennae for carrying signals transversely across the belt during normal belt operating conditions and for ceasing the carrying of signals when the belt and antenna or conductor are ripped, said antenna being formed from a plurality of stainless steel filaments.

25. The system of claim 24 further comprising said stainless steel filaments wrapped about a conductive core.

26. The system of claim 25 wherein said antenna or conductor is a repeating undulating wave form in only one plane.

* * * * *